United States Patent
Jeon et al.

(10) Patent No.: US 9,667,734 B2
(45) Date of Patent: May 30, 2017

(54) PUSH NOTIFICATION-BASED REMOTE CONTROL METHOD AND APPARATUS FOR THE SAME

(71) Applicant: ELECTRONICS AND TELECOMMUNICATIONS RESEARCH INSTITUTE, Daejeon (KR)

(72) Inventors: Jong-Hong Jeon, Daejeon (KR); Sung-Han Kim, Daejeon (KR); Kang-Chan Lee, Daejeon (KR); Min-Kyo In, Daejeon (KR); Seung-Yun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 175 days.

(21) Appl. No.: 14/564,375

(22) Filed: Dec. 9, 2014

(65) Prior Publication Data
US 2015/0163178 A1   Jun. 11, 2015

(30) Foreign Application Priority Data

Dec. 9, 2013 (KR) .................. 10-2013-0152466
Sep. 2, 2014 (KR) .................. 10-2014-0116390

(51) Int. Cl.
*G06F 15/16* (2006.01)
*H04L 29/08* (2006.01)
*H04L 12/18* (2006.01)
*H04L 12/58* (2006.01)

(52) U.S. Cl.
CPC .......... *H04L 67/26* (2013.01); *H04L 12/1859* (2013.01); *H04L 51/18* (2013.01)

(58) Field of Classification Search
CPC ...... H04L 67/26; H04L 12/1859; H04L 51/18
USPC ............... 709/206, 207, 217, 220, 230, 203
See application file for complete search history.

(56) References Cited

U.S. PATENT DOCUMENTS

| | | | |
|---|---|---|---|
| 4,779,208 A * | 10/1988 | Tsuruta ................. | G06N 5/046 706/50 |
| 8,179,822 B2 * | 5/2012 | Shiina ................. | H04M 3/4938 370/261 |
| 8,195,779 B2 * | 6/2012 | Wong ................. | H04L 41/0213 709/220 |
| 2002/0180579 A1* | 12/2002 | Nagaoka ............. | H04L 12/2803 340/3.1 |
| 2003/0088633 A1* | 5/2003 | Chiu ...................... | H04L 29/06 709/206 |

(Continued)

*Primary Examiner* — Michael Y Won
(74) *Attorney, Agent, or Firm* — Kile Park Reed & Houtteman PLLC

(57) ABSTRACT

Disclosed herein are a push notification-based remote control method and an apparatus for the remote control method. A push notification client includes a message receiving module for receiving a push notification message from a push notification server. A rule interpretation module determines whether a remote control rule is present in the push notification message. A rule registration management module is configured to, if it is determined that the remote control rule is present in the push notification message, register the remote control rule in a rule execution list. A rule execution module executes the remote control rule.

19 Claims, 7 Drawing Sheets

(56) References Cited

U.S. PATENT DOCUMENTS

| | | | |
|---|---|---|---|
| 2004/0001498 A1* | 1/2004 | Chen | H04L 67/28 370/401 |
| 2007/0283002 A1* | 12/2007 | Bornhoevd | G06F 9/54 709/224 |
| 2009/0157829 A1 | 6/2009 | Choi et al. | |
| 2010/0173658 A1 | 7/2010 | Fan et al. | |
| 2012/0198002 A1* | 8/2012 | Goulart | H04L 51/14 709/206 |
| 2012/0311046 A1* | 12/2012 | Grigoriev | H04W 4/12 709/206 |
| 2012/0311082 A1 | 12/2012 | Munson et al. | |
| 2013/0047034 A1 | 2/2013 | Salomon et al. | |

* cited by examiner

PUSH NOTIFICATION-BASED REMOTE CONTROL METHOD AND APPARATUS FOR THE SAME

CROSS REFERENCE TO RELATED APPLICATIONS

This application claims the benefit of Korean Patent Application Nos. 10-2013-0152466, filed Dec. 9, 2013 and 10-2014-0116390, filed Sep. 2, 2014, which are hereby incorporated by reference in their entirety into this application.

BACKGROUND OF THE INVENTION

1. Technical Field

The present invention relates generally to a push notification-based remote control method and an apparatus for the remote control method and, more particularly, to a push notification-based remote control method and an apparatus for the remote control method, which enable various types of remote control processing by executing a push notification client application program and a system operation based on a rule included in a push notification message.

2. Description of the Related Art

With the development of wireless network technology, and the popularization of smart devices including smart phones, various application programs have appeared leading to a large increase in the amount of wireless resources used. In particular, in order to provide services such as remote control of a user terminal, an 'always-on connection type' in which the user terminal is always connected to a remote control server must be adopted, and thus a problem arises in that excessive traffic is caused and battery power is rapidly consumed.

U.S. Patent Application Publication No. 2010-0173658 relates to a system, method and device for controlling a push message, and presents technology in which a feedback module is provided in a push message processing module within a push sending agent, and which returns the current sending status of a push message (success/failure in sending a push message to a push receiving agent within a client terminal) to a push message initiator.

However, the above patent does not disclose technology that performs various types of remote control processing by executing a push notification client application program and a system operation based on a rule included in a push notification message.

Therefore, there is urgently required new remote control technology in which, during a procedure for sending a push notification message from a push notification message server application program to a push notification client application program installed in a user terminal through a push notification server, the push notification message is sent with a rule for remote control included in the message, and in which a push notification client executes the push notification client application program and a system operation based on the rule included in the received push notification message, thus enabling various types of remote control processing.

SUMMARY OF THE INVENTION

Accordingly, the present invention has been made keeping in mind the above problems occurring in the prior art, and an object of the present invention is to enable various types of remote control processing in such a way that, during a procedure for sending a push notification message from a push notification message server application program to a push notification client application program installed in a user terminal through a push notification server, the push notification message is sent with a rule for remote control included in the message, and in such a way that a push notification client controls the push notification client application program and a system operation based on the rule included in the received push notification message.

Another object of the present invention is to enable a plurality of devices to be effectively, remotely controlled by causing a remote control and execution rule to be included in a push message and sending the push message to a plurality of devices, and to enable various types of control and execution represented by rules on an application installed in a device, as well as enabling only the delivery of a notification message based on a push message.

In accordance with an aspect of the present invention to accomplish the above objects, there is provided a push notification client, including a message receiving module for receiving a push notification message from a push notification server; a rule interpretation module for determining whether a remote control rule is present in the push notification message; a rule registration management module for, if it is determined that the remote control rule is present in the push notification message, registering the remote control rule in a rule execution list; and a rule execution module for executing the remote control rule.

The remote control rule may include an execution rule condition field including an execution condition; an execution command field including an execution command to be processed by an application program; a target application identifier field including an identifier of a target application that will execute the execution command; a data field including data required to execute the execution command; a processing sequence field including a processing sequence of a plurality of rules; and a duplicate processing field including information about whether duplicate processing of a rule is allowed.

The rule interpretation module may be configured to determine whether the remote control rule is included in a payload of the push notification message, and if it is determined that the remote control rule is included in the payload of the push notification message, interpret the fields included in the remote control rule.

The push notification client may further include an access control management module for determining whether the execution of the remote control rule is permitted by a user.

The rule registration management module may determine, using the execution rule condition field of the remote control rule, whether the remote control rule corresponds to either or both of a scheduled rule and a repetitive execution rule, and register the remote control rule in the rule execution list only if the remote control rule corresponds to either or both of the scheduled rule and the repetitive execution rule, and the rule execution module checks the rule execution list at preset time intervals, and if the remote control rule stored in the rule execution list is present, execute the remote control rule depending on the execution condition.

The rule registration management module may be configured to, when the remote control rule is registered in the rule execution list, determine whether registration of the remote control rule in the rule execution list is a duplicate registration, and if it is determined that registration of the remote control rule is the duplicate registration, determine using the duplicate processing field of the remote control rule whether the duplicate registration of the remote control rule is allowed, and register the remote control rule in duplicate only if it is determined that the duplicate registration of the remote control rule is allowed.

The rule execution module may be configured to if the remote control rule is registered in the rule registration management module, execute the remote control rule based on either or both of the scheduled rule and the repetitive execution rule, and if the remote control rule does not correspond to either or both of the scheduled rule and the repetitive execution rule, immediately execute the remote control rule.

The rule execution module may refer to the remote control rule registered in the rule registration management module at preset periods, and execute the remote control rule at a scheduled period depending on results of the reference.

The push execution module may be configured to, if the remote control rule is included in the payload of the push notification message, send a control command to the target application using the target application identifier field of the remote control rule, and if the remote control rule is not included in the payload of the push notification message, send contents of the push notification message to the target application that will receive the push notification message.

The rule execution module may be configured to, when failing in sending of one of the control command and the contents of the push notification message, transfer results of a failure to the push notification server application program.

In accordance with another aspect of the present invention to accomplish the above objects, there is provided a push notification server, including a server application management module for registering and managing a push notification server application program capable of sending a push notification message; a message receiving module for receiving the push notification message from the push notification server application program; a client management module for registering and managing a push notification client; a message sending management module for forwarding the push notification message to the push notification client; a server rule registration management module for determining whether a server rule for which the push notification server is an execution target is present in the push notification message, and if it is determined that the server rule is present, registering the server rule in a server rule execution list; and a server rule execution module for executing the server rule.

In accordance with a further aspect of the present invention to accomplish the above objects, there is provided a push notification-based remote control method, including receiving a push notification message from a push notification server; determining whether a remote control rule is present in the push notification message; if it is determined that the remote control rule is present in the push notification message, registering the remote control rule in a rule execution list; and executing the remote control rule.

The remote control rule may include an execution rule condition field including an execution condition; an execution command field including an execution command to be processed by an application program; a target application identifier field including an identifier of a target application that will execute the execution command; a data field including data required to execute the execution command; a processing sequence field including a processing sequence of a plurality of rules; and a duplicate processing field including information about whether duplicate processing of a rule is allowed.

The push notification-based remote control method may further include, if the remote control rule is included in a payload of the push notification message, interpreting the fields included in the remote control rule.

The push notification-based remote control method may further include determining whether the execution of the remote control rule is permitted by a user.

Executing the remote control rule may include, if the remote control rule is registered in the rule registration management module, executing the remote control rule based on either or both of a scheduled rule and a repetitive execution rule, and if the remote control rule does not correspond to either or both of the scheduled rule and the repetitive execution rule, immediately executing the remote control rule.

Registering the remote control rule in the rule execution list may include when the remote control rule is registered in the rule execution list, determining whether registration of the remote control rule in the rule execution list is a duplicate registration, and if it is determined that registration of the remote control rule is the duplicate registration, determining using the duplicate processing field of the remote control rule whether the duplicate registration of the remote control rule is allowed, and registering the remote control rule in duplicate only if it is determined that the duplicate registration of the remote control rule is allowed.

The push notification-based remote control method may further include, if the remote control rule does not correspond to either or both of the scheduled rule and the repetitive execution rule, not registering the remote control rule in the rule execution list, wherein executing the remote control rule comprises, if the remote control rule is registered in the rule registration management module, executing the remote control rule using either or both of the scheduled rule and the repetitive execution rule, and if the remote control rule does not correspond to either or both of the scheduled rule and the repetitive execution rule, immediately executing the remote control rule.

Executing the remote control rule may include if the remote control rule is included in the payload of the push notification message, sending a control command to the target application using the target application identifier field of the remote control rule, and if the remote control rule is not included in the payload of the push notification message, sending contents of the push notification message to the target application that will receive the push notification message.

Executing the remote control rule may include, when failing in sending of one of the control command and the contents of the push notification message, transferring results of a failure to the push notification server application program.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
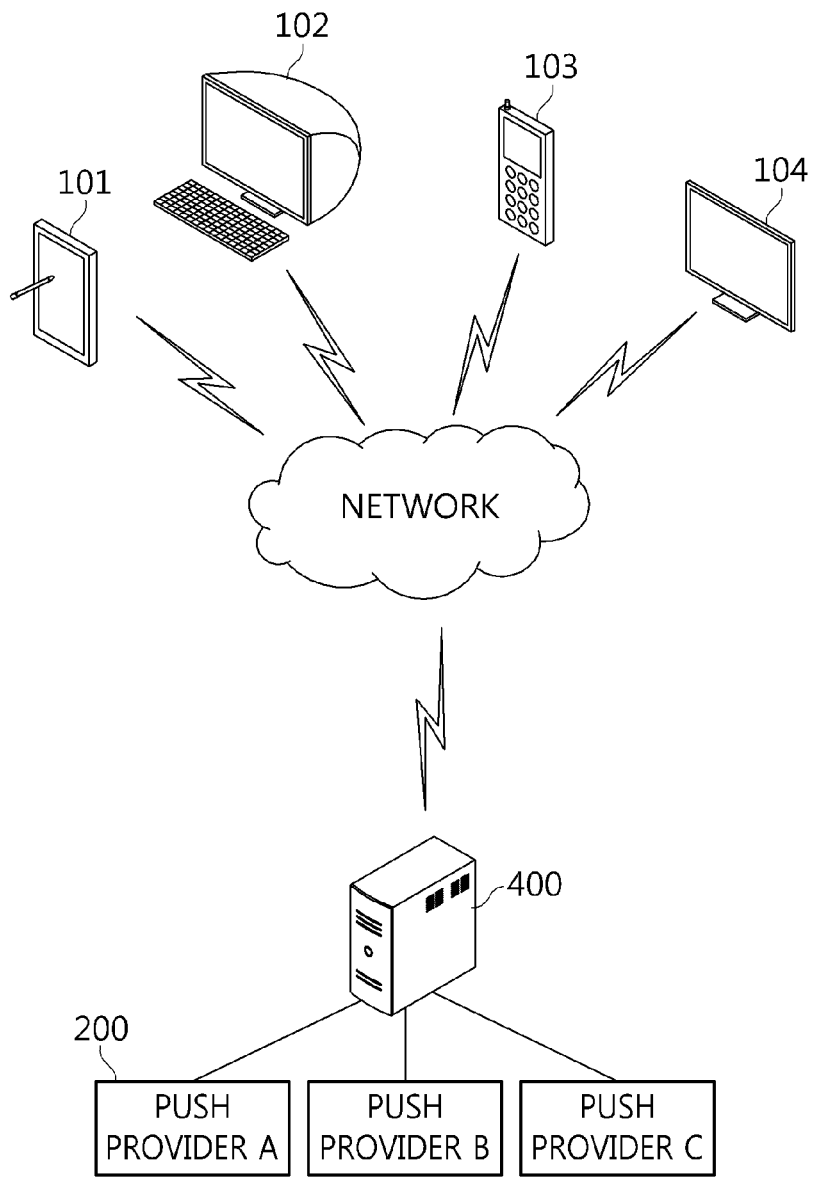
FIG. 1 is a diagram showing a push notification-based remote control system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram showing a push notification-based remote control system according to an embodiment of the present invention.

Referring to FIG. 1, the push notification-based remote control system according to the embodiment of the present invention includes user terminals 101 to 104, push message providers (or push providers) 200, and a push notification server 400.

The user terminals 101 to 104 may include various user terminals, such as a tablet 101, a computer 102, a mobile phone 103, and a smart television (TV) 104.

Further, the user terminals may include all types of terminals capable of communicating with the push notification server.

In this case, each of the user terminals 101 to 104 may include a push notification client for push notification communication.

The push notification client receives a push notification message including a rule for remote control from each push message provider 200 via the push notification server 400, interprets the remote control execution rule included in the push notification message, and registers/executes the execution rule.

Figure 2:
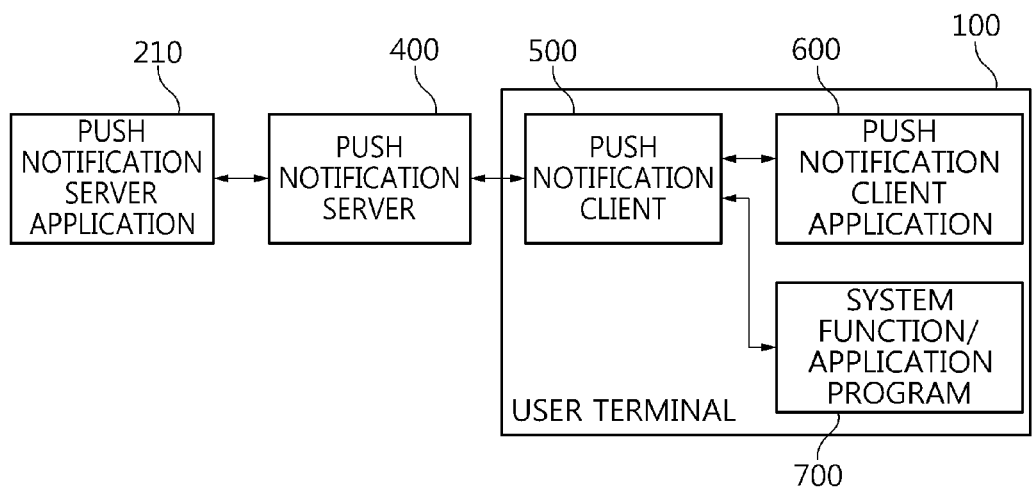
FIG. 2 is a block diagram showing a push notification-based remote control system according to an embodiment of the present invention.

FIG. 2 is a block diagram showing a push notification-based remote control system according to an embodiment of the present invention.

Referring to FIG. 2, the push notification-based remote control system according to the embodiment of the present invention includes a push notification server application program 210, a push notification server 400, and a user terminal 100.

The user terminal 100 includes a push notification client 500, a push notification client application program 600, and a system function/application program 700.

The push notification server application program 210 is an application program for sending a push notification message, generated by the push message provider 200 shown in FIG. 1 so that a remote control rule is included in the message, to the push notification server 400.

The push notification server 400 relays the push notification message received from the push notification server application program 210 to the push notification client 500 installed in the user terminal.

When a remote control rule is included in the push notification message received from the push notification server 400, the push notification client 500 interprets and executes the remote control rule, whereas when a remote control rule is not included in the push notification message, the push notification client 500 forwards the message to the push notification client application program 600.

In the above procedure, the push notification message including the remote control rule for remote control may originate at the push notification server application program 210 and may reach the push notification client application program 600 that is a remote control target, or may enable the system function/application program 700 to be executed.

Figure 3:
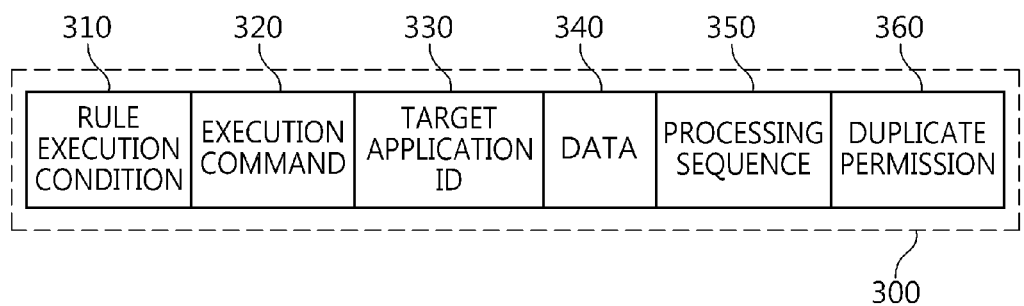
FIG. 3 is a diagram showing an example of the structure of a remote control rule according to the present invention.

FIG. 3 is a diagram showing an example of the structure of a remote control rule 300 according to the present invention.

Referring to FIG. 3, it can be seen that the structure of the remote control rule 300 according to the present invention is a specification required to represent the remote control rule in a push notification message.

Upon delivering a normal push message, the message is delivered using a message specification. Typically, the message specification includes a control command field for message delivery, a processing condition value field based on a delivery condition, a token length field indicating the size of a token for identifying a message receiving terminal, a token field for identifying the message receiving terminal, a payload field including the contents of an actually delivered push notification message, and a payload message field including the contents of the actually delivered push notification message.

In this case, the remote control rule 300 for remote control is represented by the payload field. Here, the payload field includes an execution rule condition field 310 including execution conditions, an execution command field 320 including execution commands to be processed by the application program, a target application identifier field 330 including the identifier of a target application that will execute an execution command, a data field 340 including data required to execute the execution command, a processing sequence field 350 including the processing sequence of a plurality of rules, and a duplicate processing field 360 including information about whether the duplicate processing of a rule is allowed.

Here, the execution conditions include conditions related to execution schemes, such as immediate execution, execution after a time interval, execution based on date/time, execution based on location/coordinates, periodic and repetitive execution, and system event-driven execution.

Here, the execution commands include commands for opening, notification, storage, execution of functions for respective application programs, invocation of other application programs, invocation of a system function, etc.

Figure 4:
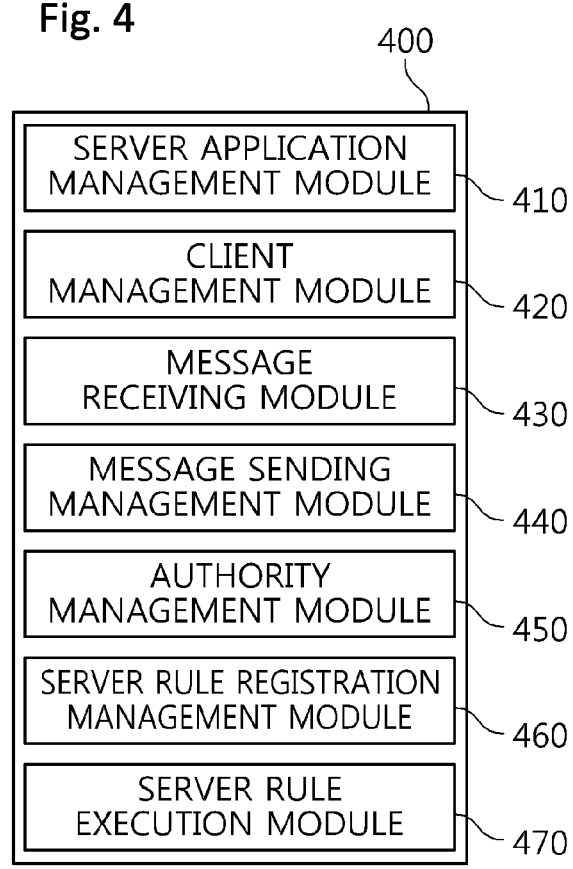
FIG. 4 is a block diagram showing a push notification server according to an embodiment of the present invention.

FIG. 4 is a block diagram showing a push notification server according to an embodiment of the present invention.

Referring to FIG. 4, the push notification server according to the embodiment of the present invention includes a server application management module 410, a message receiving module 430, a client management module 420, and a message sending management module 440.

The server application management module 410 registers and manages a push notification server application program capable of sending a push notification message.

The message receiving module 430 receives a push notification message from the push notification server application program.

The client management module 420 registers and manages a push notification client.

The message sending management module 440 forwards the push notification message to the push notification client.

In this case, the push notification server according to an embodiment of the present invention may further include an authority management module 450, a server rule registration management module 460, and a server rule execution module 470.

The authority management module 450 checks and processes authority, such as authority for a message sending authority request and a status information checking request in a process for sending/receiving a push notification message between the push notification server application program and the push notification client.

The server rule registration management module 460 determines whether a server rule for which the push notification server is an execution target is present in the push notification message, and if it is determined that the server rule is present, registers the server rule in a server rule execution list.

The server rule execution module 470 executes the server rule.

Figure 5:
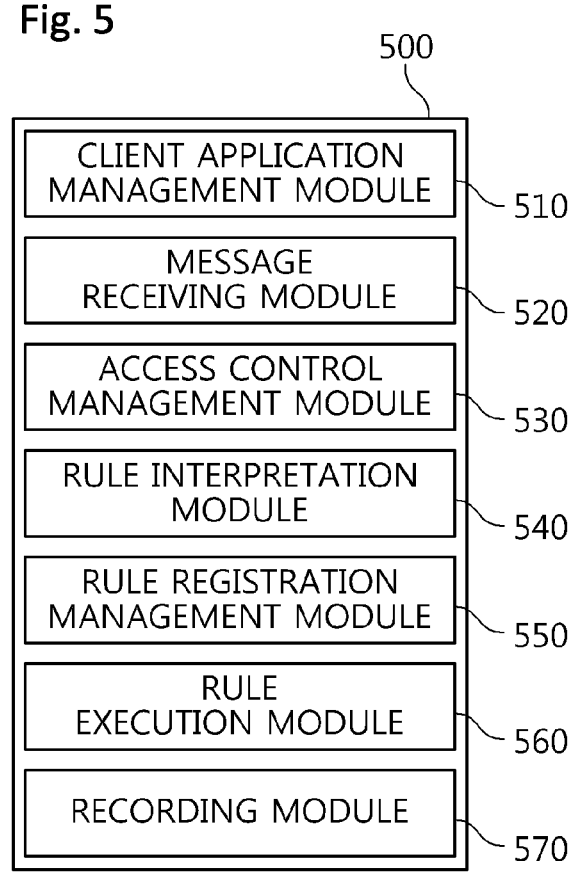
FIG. 5 is a block diagram showing a push notification client according to an embodiment of the present invention.

FIG. 5 is a block diagram showing the push notification client according to an embodiment of the present invention.

Referring to FIG. 5, the push notification client according to the embodiment of the present invention includes a message receiving module 520, a rule interpretation module 540, a rule registration management module 550, and a rule execution module 560.

The message receiving module 520 receives a push notification message from the push notification server.

The rule interpretation module 540 determines whether a remote control rule is present in the push notification message.

Here, the remote control rule may include an execution rule condition field including execution conditions; an execution command field including execution commands to be processed by the application program; a target application identifier field including the identifier of a target application that will execute an execution command; a data field including data required to execute the execution command; a processing sequence field including the processing sequence of a plurality of rules; and a duplicate processing field including information about whether the duplicate processing of a rule is allowed.

In this case, the rule interpretation module 540 may determine whether the remote control rule is included in the payload of the push notification message, and if it is determined that the remote control rule is included in the payload of the push notification message, interpret the fields included in the remote control rule.

The rule registration management module 550 registers the remote control rule in a rule execution list if the remote control rule is included in the push notification message.

In this case, the rule registration management module 550 may determine, using the execution rule condition field of the remote control rule, whether the remote control rule corresponds to either or both of a scheduled rule and a repetitive execution rule, and may register the remote control rule in the rule execution list only if the remote control rule corresponds to either or both of the scheduled rule and the repetitive execution rule.

When registering the remote control rule in the rule execution list, the rule registration management module 550 determines whether the registration of the remote control rule present in the rule execution list is a duplicate registration. If it is determined that the registration of the remote control rule is the duplicate registration, the rule registration management module 550 may determine, using the duplicate processing field of the remote control rule, whether the duplicate registration is allowed, and may register the remote control rule in duplicate only if the duplicate registration of the remote control rule is allowed.

In this case, if it is determined that the remote control rule does not correspond to either or both of the scheduled rule and the repetitive execution rule, the rule registration management module 550 may not register the remote control rule in the rule execution list.

The rule execution module 560 executes the remote control rule.

In this case, when the remote control rule is included in the payload of the push notification message, the rule execution module 560 may send a control command to the target application using the target application identification field of the remote control rule. In contrast, when the remote control rule is not included in the payload of the push notification message, the rule execution module 560 may send the contents of the push notification message to the target application that will receive the push notification message.

In this case, the rule execution module 560 may check the rule execution list at preset time intervals, and if the remote control rule stored in the rule execution list is present, may execute the remote control rule depending on the execution condition thereof.

Further, if the remote control rule does not correspond to either or both of the scheduled rule and the repetitive execution rule, the rule execution module 560 may immediately execute the remote control rule.

In this regard, when the sending of one or more of the control command and the contents of the push notification message fails, the rule execution module 560 may transfer the results of a failure to the push notification server application program.

Meanwhile, the push notification client according to an embodiment of the present invention may further include a client application management module 510, an access control management module 530, and a recording module 570.

The client application management module 510 registers and manages a push notification client application to which the push notification message including the remote control rule is to be finally delivered.

The access control management module 530 determines whether a user has authorized the execution of the remote control rule.

The recording module 570 records the results and procedure of rule execution.

Figure 6:
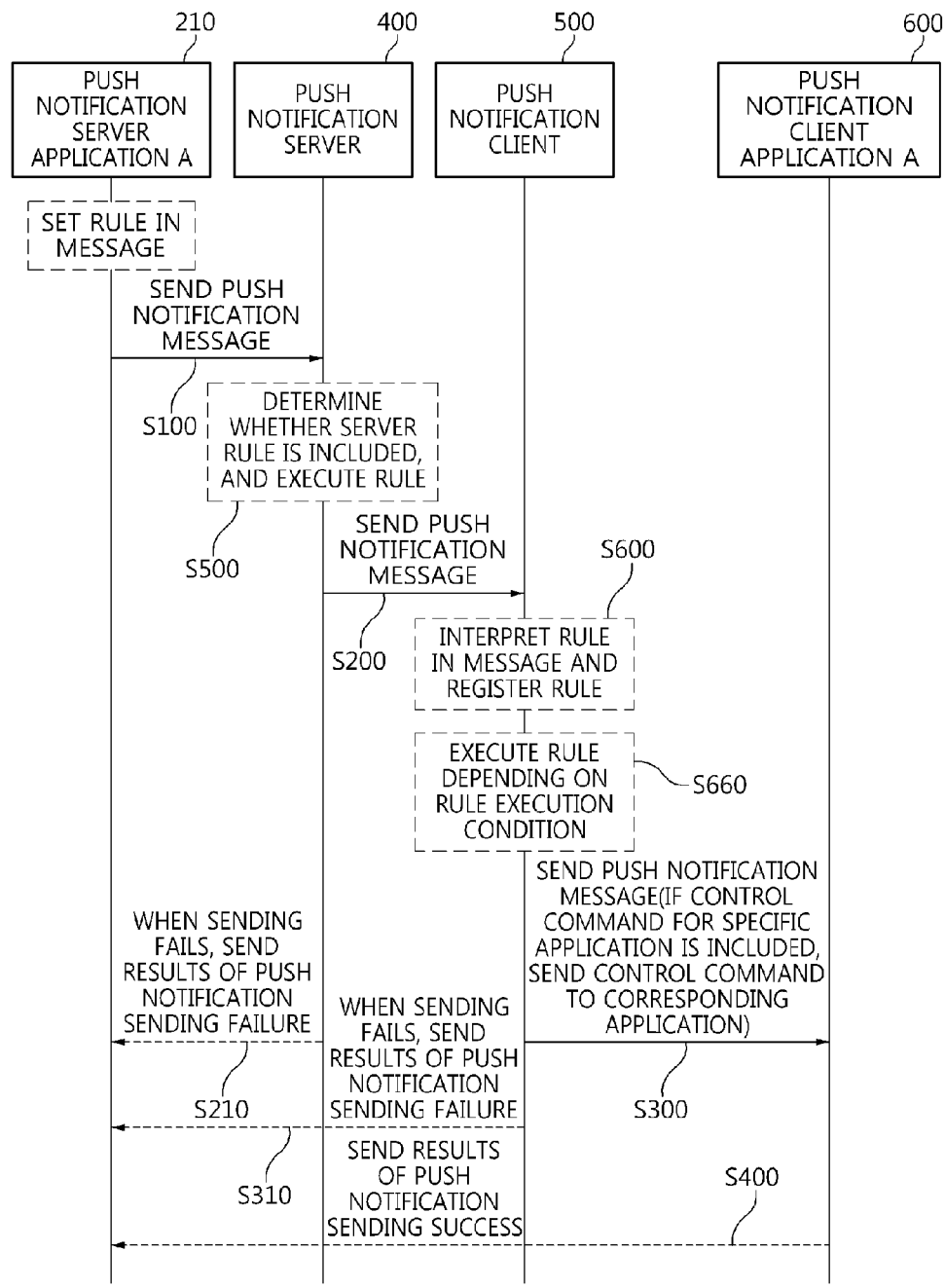
FIG. 6 is an operation flowchart showing the overall process of a push notification-based remote control method according to an embodiment of the present invention.

FIG. 6 is an operation flowchart showing the overall process of a push notification-based remote control method according to an embodiment of the present invention.

Referring to FIG. 6, in the push notification-based remote control method according to the embodiment of the present invention, the push notification server application program 210 sets a remote control rule in a push notification message, and sends the push notification message to the push notification server 400 at step S100.

Further, in the push notification-based remote control method according to an embodiment of the present invention, the push notification server 400 determines whether a server rule that is a remote control rule to be executed by the server is included in the push notification message, and executes the server rule if the server rule is included in the push notification message at step S500.

Further, in the push notification-based remote control method according to the embodiment of the present invention, the push notification server 400 sends the push notification message to the push notification client 500 at step S200.

In this case, when failing in sending the push notification message to the push notification client 500, the push notification server 400 sends a sending failure notification message to the push notification server application program 210 at step S210.

Further, in the push notification-based remote control method according to the embodiment of the present invention, the push notification client 500 interprets and registers the remote control rule included in the push notification message at step S600.

In the push notification-based remote control method according to the embodiment of the present invention, the rule is executed depending on the execution condition thereof at step S660.

In the push notification-based remote control method according to the embodiment of the present invention, the push notification client 500 sends the contents of the push notification message to the push notification client application program 600 at step S300.

In this case, when a command for controlling a specific application program is included in the push notification message, the push notification client 500 sends the control command to the corresponding application program at step S300.

That is, the push notification client 500 sends the contents of the push notification message or the control command to the push notification client application program 600.

In this case, when failing in sending the push notification message or the control command to the push notification client application program 600, the push notification client 500 sends a sending failure notification message to the push notification server application program 210 at step S310.

Further, in the push notification-based remote control method according to the embodiment of the present invention, when the push notification message is successfully sent to the push notification client application program 600, the push notification client application program 600 sends a sending success notification message to the push notification server application program 210 at step S400.

Figure 7:
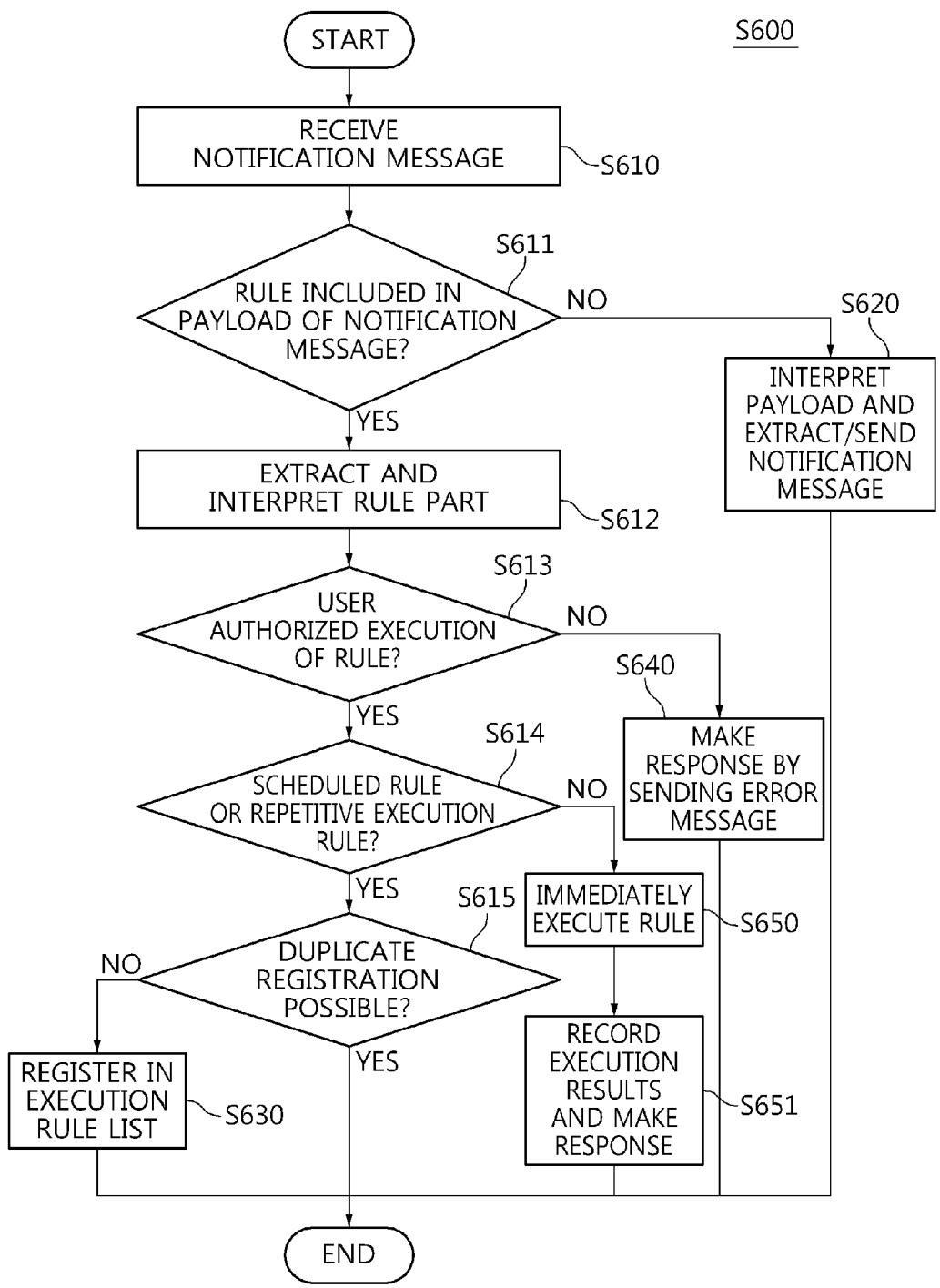
FIG. 7 is an operation flowchart showing an example of the step of interpreting and registering a remote control rule, shown in FIG. 6.

FIG. 7 is an operation flowchart showing an example of the step S600 of interpreting and registering a remote control rule, shown in FIG. 6.

Referring to FIG. 7, the step S600 of interpreting and registering the remote control rule, shown in FIG. 6, starts at a procedure in which the push notification client receives a push notification message from the push notification server at step S610. Then, the push notification client determines whether a remote control rule is included in the payload of the push notification message at step S611.

If it is determined at step S611 that a remote control rule is not included in the payload of the push notification message, the push notification client extracts a notification message included in the push notification message, and sends the notification message to the push notification client application program at step S620.

In contrast, if it is determined at step S611 that the remote control rule is included in the payload of the push notification message, the push notification client extracts and interprets a portion corresponding to the remote control rule at step S612.

Further, at the step S600 of interpreting and registering the remote control rule, shown in FIG. 6, the push notification client determines whether a user has authorized the execution of the remote control rule at step S613.

If it is determined at step S613 that the user has not authorized the execution of the remote control rule, the push notification client makes a response by sending an error message to the push notification server application program at step S640.

In contrast, if it is determined at step S613 that the user has authorized the execution of the remote control rule, the push notification client determines whether the remote control rule corresponds to either a scheduled rule or a repetitive execution rule at step S614.

If it is determined at step S614 that the remote control rule is neither a scheduled rule nor a repetitive execution rule, the push notification client immediately executes the remote control rule at step S650, records the results of execution, and sends a success notification message to the push notification server application program at step S651.

In contrast, if it is determined at step S614 that the remote control rule is the scheduled rule or the repetitive execution rule, the push notification client determines whether the duplicate registration of the remote control rule is allowed upon registering the remote control rule at step S615.

If it is determined at step S615 that the registration of the remote control rule is not a duplicate registration upon registering the remote control rule, the push notification client registers the corresponding remote control rule in the execution rule list at step S630.

Figure 8:
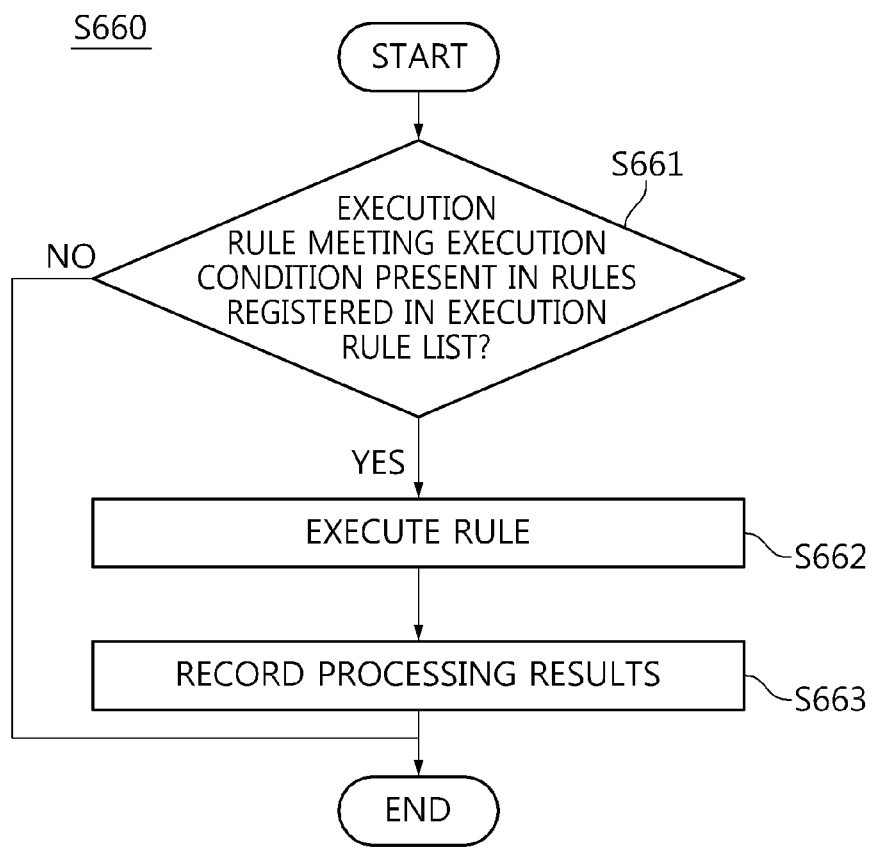
FIG. 8 is an operation flowchart showing an example of the step of executing a rule, shown in FIG. 6.

FIG. 8 is an operation flowchart showing an example of the step S660 of executing the rule, shown in FIG. 6.

Referring to FIG. 8, at the rule execution step S660 shown in FIG. 6, the push notification client determines whether a rule meeting an execution condition is present in the rules registered in the execution rule list at step S661.

If it is determined at step S661 that the rule meeting the execution condition is present in the rules registered in the execution rule list, the push notification client executes the corresponding rule at step S662.

Further, at the rule execution step S660 shown in FIG. 6, if the corresponding rule has been executed, the results of execution are recorded at step S663.

The push notification-based remote control method according to at least one embodiment of the present invention may be implemented as a program that can be executed by various computer means, and the program may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

In accordance with the present invention, there is an advantage in that the present invention enables various types of remote control processing in such a way that, during a procedure for sending a push notification message from a push notification message server application program to a push notification client application program installed in a user terminal through a push notification server, the push notification message is sent with a rule for remote control included in the message, and in such a way that a push notification client controls the push notification client application program and a system operation based on the rule included in the received push notification message.

Further, the present invention is advantageous in that it enables a plurality of devices to be effectively, remotely controlled by causing a remote control and execution rule to be included in a push message and sending the push message to a plurality of devices, and enables various types of control and execution represented by rules on an application installed in a device, as well as enabling only the delivery of a notification message based on a push message.

As described above, in the push notification-remote control method and the apparatus for the remote control method according to the present invention, the configurations and schemes in the above-described embodiments are not limitedly applied, and some or all of the above embodiments can be selectively combined and configured so that various modifications are allowed.

What is claimed is:

1. A push notification client, comprising:
a message receiving module for receiving a push notification message from a push notification server;
a rule interpretation module for determining whether a remote control rule is present in the push notification message;
a rule registration management module for, if it is determined that the remote control rule is present in the push notification message, registering the remote control rule in a rule execution list; and
a rule execution module for executing the remote control rule,
wherein the rule execution module is configured to, if the remote control rule is included in a payload of the push notification message, use the remote control rule to send a control command to a target application that will execute the control command,
wherein the rule registration management module is configured to, when the remote control rule is registered in the rule execution list, determine whether registration of the remote control rule in the rule execution list is a duplicate registration, if it is determined that registration of the remote control rule is the duplicate registration, determine using the remote control rule whether the duplicate registration of the remote control rule is allowed, and register the remote control rule in the rule execution list in duplicate only if it is determined that the duplicate registration of the remote control rule is allowed, and if it is determined that registration of the remote control rule is not the duplicate registration, register the remote control rule in the rule execution list.

2. The push notification client of claim 1, wherein the remote control rule includes:

an execution rule condition field including an execution condition;
an execution command field including an execution command to be processed by an application program;
a target application identifier field including an identifier of a target application that will execute the execution command;
a data field including data required to execute the execution command;
a processing sequence field including a processing sequence of a plurality of rules; and
a duplicate processing field including information about whether duplicate processing of a rule is allowed.

3. The push notification client of claim 2, wherein the rule interpretation module is configured to determine whether the remote control rule is included in the payload of the push notification message, and if it is determined that the remote control rule is included in the payload of the push notification message, interpret the fields included in the remote control rule.

4. The push notification client of claim 3, further comprising an access control management module for determining whether the execution of the remote control rule is permitted by a user.

5. The push notification client of claim 4, wherein:
the rule registration management module determines, using the execution rule condition field of the remote control rule, whether the remote control rule corresponds to either or both of a scheduled rule and a repetitive execution rule, and registers the remote control rule in the rule execution list only if the remote control rule corresponds to either or both of the scheduled rule and the repetitive execution rule, and
the rule execution module checks the rule execution list at preset time intervals, and if the remote control rule stored in the rule execution list is present, executes the remote control rule depending on the execution condition.

6. The push notification client of claim 5, wherein the rule registration management module is configured to determine using the duplicate processing field of the remote control rule whether the duplicate registration of the remote control rule is allowed.

7. The push notification client of claim 5, wherein the rule execution module is configured to:
if the remote control rule is registered in the rule registration management module, execute the remote control rule based on either or both of the scheduled rule and the repetitive execution rule, and
if the remote control rule does not correspond to either or both of the scheduled rule and the repetitive execution rule, immediately execute the remote control rule.

8. The push notification client of claim 7, wherein the rule execution module refers to the remote control rule registered in the rule registration management module at preset periods, and executes the remote control rule at a scheduled period depending on results of the reference.

9. The push notification client of claim 5, wherein the rule execution module is configured to send the control command to the target application using the target application identifier field of the remote control rule, and if the remote control rule is not included in the payload of the push notification message, send contents of the push notification message to the target application that will receive the push notification message.

10. The push notification client of claim 9, wherein the rule execution module is configured to, when failing in sending of one of the control command and the contents of the push notification message, transfer results of a failure to the push notification server application program.

11. A push notification-based remote control method, comprising:
  receiving, by a push notification client, a push notification message from a push notification server;
  determining, by the push notification client, whether a remote control rule is present in the push notification message;
  if it is determined that the remote control rule is present in the push notification message, registering, by the push notification client, the remote control rule in a rule execution list; and
  executing, by the push notification client, the remote control rule,
  wherein executing the remote control rule comprises if the remote control rule is included in a payload of the push notification message, using the remote control rule to send a control command to a target application that will execute the control command and
  wherein registering the remote control rule in the rule execution list comprises:
    when the remote control rule is registered in the rule execution list, determining whether registration of the remote control rule in the rule execution list is a duplicate registration, and if it is determined that registration of the remote control rule is the duplicate registration, determining using the remote control rule whether the duplicate registration of the remote control rule is allowed, and registering the remote control rule in the rule execution list in duplicate only if it is determined that the duplicate registration of the remote control rule is allowed, and if it is determined that registration of the remote control rule is not the duplicate registration, register the remote control rule in the rule execution list.

12. The push notification-based remote control method of claim 11, wherein the remote control rule includes:
  an execution rule condition field including an execution condition;
  an execution command field including an execution command to be processed by an application program;
  a target application identifier field including an identifier of a target application that will execute the execution command;
  a data field including data required to execute the execution command;
  a processing sequence field including a processing sequence of a plurality of rules; and
  a duplicate processing field including information about whether duplicate processing of a rule is allowed.

13. The push notification-based remote control method of claim 12, further comprising:
  if the remote control rule is included in the payload of the push notification message, interpreting the fields included in the remote control rule.

14. The push notification-based remote control method of claim 13, further comprising determining whether the execution of the remote control rule is permitted by a user.

15. The push notification-based remote control method of claim 14, wherein executing the remote control rule comprises:
  if the remote control rule is registered in the rule registration management module, executing the remote control rule based on either or both of a scheduled rule and a repetitive execution rule, and
  if the remote control rule does not correspond to either or both of the scheduled rule and the repetitive execution rule, immediately executing the remote control rule.

16. The push notification-based remote control method of claim 15, wherein registering the remote control rule in the rule execution list comprises:
  determining using the duplicate processing field of the remote control rule whether the duplicate registration of the remote control rule is allowed.

17. The push notification-based remote control method of claim 15, further comprising, if the remote control rule does not correspond to either or both of the scheduled rule and the repetitive execution rule, not registering the remote control rule in the rule execution list,
  wherein executing the remote control rule comprises, if the remote control rule is registered in the rule registration management module, executing the remote control rule using either or both of the scheduled rule and the repetitive execution rule, and if the remote control rule does not correspond to either or both of the scheduled rule and the repetitive execution rule, immediately executing the remote control rule.

18. The push notification-based remote control method of claim 15, wherein executing the remote control rule comprises:
  sending the control command to the target application using the target application identifier field of the remote control rule, and if the remote control rule is not included in the payload of the push notification message, sending contents of the push notification message to the target application that will receive the push notification message.

19. The push notification-based remote control method of claim 18, wherein executing the remote control rule comprises:
  when failing in sending of one of the control command and the contents of the push notification message, transferring results of a failure to the push notification server application program.

* * * * *